United States Patent [19]

Thiersault et al.

[11] Patent Number: 4,634,735
[45] Date of Patent: Jan. 6, 1987

[54] POLYPROPYLENE COMPOSITIONS WITH HIGH IMPACT STRENGTH

[75] Inventors: Jean P. Thiersault, Martigues; Alain Senez, Callas-Cabriès, both of France

[73] Assignee: BP Chemicals Limited, London, England

[21] Appl. No.: 601,124

[22] Filed: Apr. 18, 1984

Related U.S. Application Data

[63] Continuation of Ser. No. 319,146, Nov. 9, 1981, abandoned.

[30] Foreign Application Priority Data

Nov. 13, 1980 [FR] France ................................ 80 24095

[51] Int. Cl.$^4$ ...................... C08L 23/12; C08L 23/16; C08L 23/18; C08L 53/00
[52] U.S. Cl. .................................... 525/88; 525/240; 525/211; 293/102; 293/31; 524/518; 524/528
[58] Field of Search ........................... 525/240, 211, 88

[56] References Cited

U.S. PATENT DOCUMENTS

| | | | |
|---|---|---|---|
| 3,256,367 | 6/1966 | Jayne | 525/240 |
| 3,517,086 | 6/1970 | Shirayama et al. | 525/240 |
| 3,562,790 | 2/1971 | Coover et al. | 260/876 |
| 3,937,758 | 2/1976 | Castagna | 525/88 |
| 4,076,698 | 2/1978 | Anderson et al. | 526/348.6 |
| 4,087,485 | 5/1978 | Huff | 525/240 |
| 4,302,557 | 11/1981 | Yoshimura et al. | 525/240 |

FOREIGN PATENT DOCUMENTS

| | | |
|---|---|---|
| 2405961 | 5/1979 | France . |
| 815805 | 7/1959 | United Kingdom . |

OTHER PUBLICATIONS

"New Polyethylenes"-Package Engineering pp. 39-40-2/80.
"New Materials"-Plastics World p. 80-12/79.

*Primary Examiner*—Carman J. Seccuro
*Attorney, Agent, or Firm*—Brooks Haidt Haffner & Delahunty

[57] ABSTRACT

The invention concerns polypropylene compositions with high impact strength adapted to the manufacture of car components such as bumpers or dashboards, characterized in that they contain:
(a) 50 to 97% by weight of isotactic polypropylene
(b) 2 to 49% by weight of elastomer
(c) 1 to 30% by weight of linear low density polyethylene, of a density up to 0.935.

10 Claims, No Drawings

POLYPROPYLENE COMPOSITIONS WITH HIGH IMPACT STRENGTH

This application is a continuation of application Ser. No. 319,146, filed Nov. 9, 1981, now abandoned.

The invention relates to polypropylene compositions of high impact strength, which can be prepared with ordinary extruders. More particularly, it concerns polypropylene compositions for the manufacture of industrial parts, such as car components or servicing equipment.

Articles made of isotactic polypropylene are known to have relatively little impact strength at the temperatures at which they are commonly used, and in particular to be very breakable at temperatures below 5° C.

Various methods have already been employed to overcome this disadvantage. In particular, the incorporation of various elastomers in the polypropylene, such as amorphous copolymers of ethylene and propylene, is known to give a substantial improvement in impact strength, especially at low temperatures. It has also been proposed to prepare ternary mixtures comprising polypropylene, polyethylene and elastomers, which are stronger than the binary mixtures mentioned above. As described e.g. in French Pat. No. 1 456 359, the ternary mixtures generally comprise from 70 to 94% by weight of isotactic polypropylene, from 5 to 20% by weight of elastomer, of the amorphous ethylene/propylene copolymer type, and from 1 to 25% by weight of polyethylene of high density, preferably from 0.95 to 0.97.

All these known mixtures including an elastomer have properties which improve, the more intimately the constituents are mixed. It is therefore recommended to provide a very effective mixing action in their preparation, an action which can be provided only by machines of the internal mixer type, such as Banbury mixers, which involve high capital costs and high energy consumption. Unless this can be done the mixtures obtained will have relatively poor mechanical properties, especially as far as impact strength is concerned.

With a view to improving the blending of the constituents and at the same time the mechanical properties of the products obtained, it has been proposed (French Pat. No. 2 113 130) to prepare ternary mixtures of the same type as those mentioned above, by dissolving the constituents of the mix in an appropriate solvent, then by removing the solvent from the solution through vaporisation by expansion, under pressure and temperature conditions such that a mixture of melted polymer almost free from solvent is obtained. However, the technique is difficult to carry out. In particular it involves using autoclaves which can continuously agitate viscous polymer solutions.

Applicants have now discovered compositions essentially comprising isotactic polypropylene, elastomer and some copolymers of ethylene and of one or more upper alpha-olefins, of the type generally referred to as linear low density polythene (LLDP). These compositions have mechanical properties and particularly impact strength which are far superior to the previously known ternary mixtures mentioned above. Furthermore they can be prepared very easily, simply by mixing them in the melted state in the normal type of extruder.

The invention thus concerns polypropylene compositions of high impact strength, essentially comprising:
(a) from 50 to 97% by weight of isotactic polypropylene (b) from 2 to 49% by weight of elastomers (c) from 1 to 25% by weight of linear low density polyethylene, of a density of up to 0.935.

In accordance with the invention the isotactic polypropylene used may have a mean molecular weight between 50,000 and 500,000. It is possible to use the normal, commercially available grades of polypropylene, which are virtually isotactic and suitable for the common applications of injection or extrusion.

A wide variety of products may be used as the elastomers, e.g. butyl rubbers, PIB and SBS. However, it is preferable to use elastomers of the "EPM" type, which are rubbery copolymers of ethylene and propylene containing approximately 30 to 70% and preferably approximately 40 to 60% by weight of groups derived from propylene. it is also advantageous to use rubbery terpolymers of ethylene, propylene and a diene such as dicyclopentadience, ethylidene norbornene or 1-4-hexadiene; these terpolymers are generally referred to as "EPDM" elastomers.

It is equally possible for all or part of the elastomer used in the compositions of the invention to be replaced by a copolymerisation sequence, applied to a mixture with an equivalent weight of ethylene and propylene, containing from 20 to 70% by weight of propylene, the statistical copolymerising sequence being carried out e.g. between two propylene-synthesising sequences or preferably when the synthesis is just over.

The linear low density polyethylene used can be obtained by copolymerising 80 to 96% by weight of ethylene with 4 to 20% by weight of one or more upper alpha-olefins containing 3 to 8 carbon atoms and selected particularly from propylene, 1-n-butene, 1-n-hexene, 4-methyl-1-pentene and 1-n-octene. Copolymerisation of the mixture of monomers is carried out by one of the known low pressure processes, and particularly at a pressure below $4.10^6$ Pa in the presence of a catalytic system of the Ziegler type.

The linear low density polyethylene may preferably be obtained by copolymerisation in the gas phase. In particular, it may advantageously be prepared by the method of copolymerisating ethylene and an upper alpha-olefin in a fluidised bed, as described in French Pat. No. 2 405 961.

It has in fact been found that linear low density polyethylenes prepared by this method of copolymerising in a fluidised bed have a very special structure and give the compositions of the invention remarkable advantageous properties.

The special structure can be demonstrated particularly by differential enthalpy analysis. This shows the low linear density polyethylenes prepared in a fluidised bed to have a crystalline phase with a melting point above 115° C. and a relatively large amorphous phase with a fairly broad fusion range situated below 115° C.

The constituents of the compositions of the invention should preferably be blended in the melted state. An effective method comprises first mixing the constituents in granular or powder form, then mixing them in the melted state in the usual type of machine, such as single screw or twin screw extruders, and following up these operations with a granulation stage. In some cases it is possible to carry out mixing in the melted state directly from the granulated or powdered constituents, in the machines for converting them to finished articles (extruders, injection presses).

Various inorganic fillers such as talc, calcium carbonate or mica may be included in the compositions of the invention, to a maximum of approximately 100% of their weight.

The compositions of the invention, possibly with fillers added, are particularly suitable for manufacturing various car components, such as bumpers or dashboards.

Without being restrictive, the examples which follow bring out the advantages of the mixtures according to the invention over previously known mixtures. In the examples the linear low density polyethylenes used are prepared by a method of copolymerising in a fluidised bed. They have the following properties:

"Natene BD 302"-Copolymer of ethylene and propylene

Melt index at 2.16 kg and 190° C: 2
(Standard NF T 51016—Method A)
Density (Standard NF T 51063): 0.920
Content of groups derived from propylene: 12% by weight.

"Natene BD 403"-Copolymer of ethylene and 1-n-butene

Melt index at 2.16 kg and 190° C.: 1.5
(Standard NF T 51016-Method A)
Density (Standard NF T 51063): 0.928
Content of groups derived from 1-n-butene: 6.7% by weight.

The polyethylenes which are used as a comparison in example 1 have the following properties:

High density polyethylene "Natene 60060 AG"—Homopolymer of ethylene

Density: 0.960
Melt index at 2.16 kg and 190° C.: 0.6

High pressure polyethylene obtained by radical polymerisation of ethylene at high pressure Density: 0.920
Melt index at 2.16 kg and 190° C: 2

EXAMPLE 1

Two compositions A and B are prepared on a twin screw Werner 28 granulator. Each comprises (a) 80 parts by weight of homopolymeric polypropylene "Napryl 61200 AG" (Melt index of 3 at 2.16 kg and 230° C.) and 14 parts by weight of EPDM elastomer "Nordel 1500" (Du Pont) and (b) respectively 6 parts by weight of "Natene BD 302" and 6 parts by weight of "Natene BD 403". Similar compositions are made as a comparison, with the "Natene BD 302" or "BD 403" being replaced by "high pressure" polyethylene (composition C), then by a "high density" polyethylene of the trade mark "Natene 60060 AG" (composition D).

The mechanical properties of the slabs moulded from these four ternary compositions are set out in table I, where they are compared with those of a binary mixture "Napryl 61200 AG"/"Nordel 1500" in proportions of 85/15 (composition E). Under these conditions the four ternary compositions substantially correspond to a dilution of the binary mixture with four polyethylenes of different types.

The four ternary compositions are found to have tensile strength and elongation at break which shows no change from that of the binary mixture "Napryl 61200 AG"/"Nordel 1500". On the other hand the Charpy impact strength of the ternary compositions containing 6 parts by weight of LLDP ("Natene BD 302" or "Natene BD 403") is far higher than that of the other ternary compositions containing 6 parts by weight of "high density" polyethylene ("Natene 60060 AG") or "high pressure" polyethylene, and far higher than that of the binary mixture "Napryl 61200 AG"/"Nordel 1500". This advantage is particularly evident near room temperature.

EXAMPLE 2

A composition according to the invention containing the following constituents is prepared by passing it through a twin screw Werner 28 extruder:

90 parts by weight of sequenced copolymeric polypropylene "Napryl 51351 AG", with a melt index at 2.16 kg and 230° C. of 3.5; this comprising, for 90% of the weight, a propylene homopolymerising sequence which is followed, for 10% of the weight, by a sequence of copolymerising a mixture made up of 70% by weight of ethylene and 30% by weight of propylene;

10 parts by weight of LLDP "Natene BD 302"

As a comparison, "Napryl 51351 AG" is treated alone, on the same extruder and under the same conditions.

Table 2 shows that the composition containing "Natene BD 302" has far higher impact strength than that containing polypropylene alone; moreover the loss of rigidity represented by the reduction in tensile strength is only slight.

TABLE 1

Mechanical properties of the various mixtures

| Compositions or mixtures | A | B | C | D | E |
|---|---|---|---|---|---|
| "Napryl 61200 AG" (parts by weight) | 80 | 80 | 80 | 80 | 85 |
| "Nordel 1500" (parts by weight) | 14 | 14 | 14 | 14 | 15 |
| "Natene BD 302" (parts by weight) | 6 | | | | |
| "Natene BD 403" (parts by weight) | | 6 | | | |
| HP polyethylene (parts by weight) | | | 6 | | |
| "Natene 60060 AG" (parts by weight) | | | | 6 | |
| Tensile strength (MPa) | 24 | 24 | 24 | 24 | 24 |
| Elongation at break (%) | 650 | 650 | 650 | 650 | 650 |
| Charpy impact strength (KJ/m$^2$) | | | | | |
| at 23° C. | 16 | 13 | 8 | 11 | 10 |
| at 0° C. | 5 | 5 | 4 | 4 | 4 |

TABLE 2

| | | |
|---|---|---|
| "Napryl 51351 AG" (parts by weight) | 100 | 90 |
| LLDP "Natene BD 302" (parts by weight) | 0 | 10 |
| Tensile strength (MPa) | 24.5 | 22.5 |
| Elongation at break (%) | 600 | 500 |
| Charpy impact strength (KJ/m$^2$) | | |
| at 23° C. | 11 | 16 |
| at 0° C. | 5 | 7.5 |

The various properties quoted were measured in accordance with the following standards:

| | French standard (NF) |
|---|---|
| Measurements | |
| Melt index | NF T 51016 |
| Density | NF T 51063 |
| Tensile strength | NF T 51034 |
| Charpy impact strength | NF T 51035 |
| Special measurements on film | |
| Resistance to tearing | NF T 54108 |
| Resistance to perforation | NF T 54109 |

We claim:

1. Polypropylene compositions of high impact strength, in which the polymeric component consists essentially of:
   (a) from 50 to 97% by weight of isotactic polypropylene
   (b) from 2 to 49% by weight of elastomer which is a rubber of the EPM or EPDM type
   (c) from 1 to 10% by weight of linear low density polyethylene formed by low pressure polymerisation in the gaseous phase in a fluidized bed and having a density of up to 0.928.

2. The compositions of claim 1, wherein all or part of the elastomer is incorporated in the composition by carrying out one or more stages of statistical copolymerisation of a mixture of ethylene and propylene, containing about 20% to about 70% by weight of propylene, at the end of or during the synthesis of the isotactic polypropylene.

3. The compositions of claim 1, wherein the linear low density polyethylene is obtained by copolymerising, 80 to 96% by weight of ethylene with 4 to 20% by weight of one or more upper alphaolefins containing 3 to 8 carbon atoms, selected particularly from propylene, 1-n-butene, 1-n-hexene, 4-methyl-1-pentene or 1-n-octene, the copolymerization being carried out at a pressure below $4.10^6$ Pa.

4. The compositions of claim 1, with inorganic fillers added to them in quantities of up to 100% of their weight.

5. A method of preparing the compositions of claim 1, comprising mixing the constituents in the melted state.

6. The method of claim 5, wherein the constituents are first mixed in powder form, then mixed in the melted state in the normal type of extruder.

7. A process for the manufacture of various articles with high impact strength, comprising using a composition according to claim 1 for the preparation of said article.

8. A process according to claim 7, wherein said article is a bumper for cars.

9. A process according to claim 7, wherein said article is a dashboard for cars.

10. A polypropylene composition of high impact strength, in which the polymeric component comprises
   (a) from 80% to 97% by weight of isotactic polypropylene,
   (b) from 2% to 14% by weight of elastomer which is a rubber of the EPM or EPDM type, and
   (c) from 1% to 6% by weight of linear low density polyethylene formed by low pressure polymerization in the gaseous phase in a fluidised bed and having a density of up to 0.928.

* * * * *